(12) United States Patent
Brimeyer et al.

(10) Patent No.: US 10,820,466 B2
(45) Date of Patent: Nov. 3, 2020

(54) ORIFICED CHECK VALVE IN WING CIRCUIT

(71) Applicant: Deere & Company, Moline, IL (US)

(72) Inventors: Alex Brimeyer, Bettendorf, IA (US);
Paul D. Marvin, DeWitt, IA (US);
Alison E. Bergmann, Bettendorf, IA (US); David Eric Renner, Rock Island, IL (US)

(73) Assignee: Deere & Company, Moline, IL (US)

( * ) Notice: Subject to any disclaimer, the term of this patent is extended or adjusted under 35 U.S.C. 154(b) by 196 days.

(21) Appl. No.: 16/028,363

(22) Filed: Jul. 5, 2018

(65) Prior Publication Data
US 2020/0008338 A1   Jan. 9, 2020

(51) Int. Cl.
| A01D 34/00 | (2006.01) |
| A01D 41/14 | (2006.01) |
| A01B 73/04 | (2006.01) |
| A01B 63/108 | (2006.01) |
| A01B 63/00 | (2006.01) |
| F15B 1/027 | (2006.01) |

(52) U.S. Cl.
CPC .......... *A01B 63/108* (2013.01); *A01B 63/008* (2013.01); *A01D 41/145* (2013.01); *F15B 1/027* (2013.01)

(58) Field of Classification Search
CPC ....... A01B 63/108; A01B 63/08; A01B 63/10; A01B 73/065; A01B 73/06; A01D 34/04; A01D 34/661; A01D 41/145; A01D 41/14; A01D 41/141; A01D 61/002; A01D 75/285; A01D 45/021; A01D 45/00; F15B 1/027; F15B 11/028
USPC ............... 56/10.2 R, 10.2 E, 10.9, 11.9, 208; 60/413, 416, 469; 172/2, 4, 4.5, 7
See application file for complete search history.

(56) References Cited

U.S. PATENT DOCUMENTS

| 6,151,874 A | * | 11/2000 | Eis ......................... A01B 63/10 |
| | | | 56/10.2 E |
| 6,619,020 B1 | * | 9/2003 | Chaney ................ A01D 41/142 |
| | | | 56/10.9 |

(Continued)

FOREIGN PATENT DOCUMENTS

| CN | 103544370 A | 1/2014 |
| DE | 2919123 A1 | 11/1980 |
| FR | 1530874 A | 6/1968 |

OTHER PUBLICATIONS

European Search Report issued in counterpart European Patent Application No. 191841212 dated Jan. 8, 2020 (6 pages).

(Continued)

*Primary Examiner* — Robert E Pezzuto
(74) *Attorney, Agent, or Firm* — Foley & Lardner LLP

(57) ABSTRACT

A wing locking system for a harvesting header is provided. The wing locking system includes an accumulator, a fluid cylinder operably attached to a wing of the harvesting header, a hose fluidly connecting the accumulator and the fluid cylinder, and a valve operably disposed between the accumulator and the fluid cylinder. The valve includes a first selectable position configured to permit a first fluid flow rate between the accumulator and the fluid cylinder and a second selectable position configured to permit a second fluid flow rate from the accumulator to the fluid cylinder. The first fluid flow rate is greater than the second fluid flow rate.

20 Claims, 13 Drawing Sheets

(56) References Cited

U.S. PATENT DOCUMENTS

| | | | | |
|---|---|---|---|---|
| 6,901,729 | B1* | 6/2005 | Otto | A01D 41/145 56/208 |
| 7,222,475 | B2* | 5/2007 | Bomleny | A01D 41/141 56/10.2 E |
| 7,467,506 | B2 | 12/2008 | Lovett et al. | |
| 8,919,086 | B2 | 12/2014 | Markt | |
| 2016/0262301 | A1* | 9/2016 | van Vooren | A01D 41/144 |
| 2018/0035598 | A1* | 2/2018 | Wenger | A01D 34/04 |

OTHER PUBLICATIONS

Engineering Essentials: Types of Speed-Control Circuits, dated Jan. 1, 2012, 3 pages.

* cited by examiner

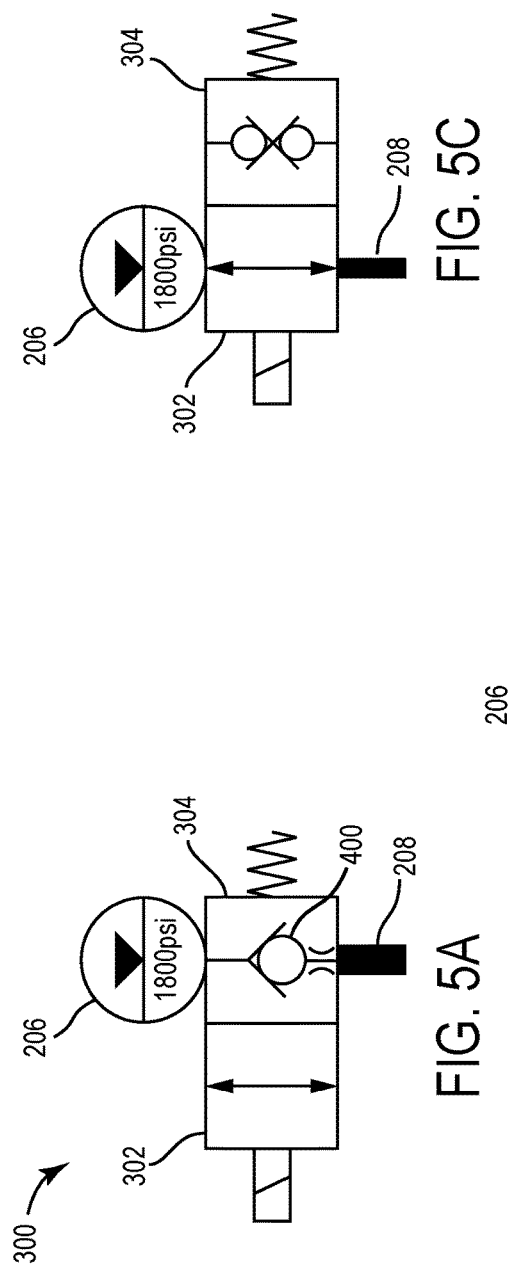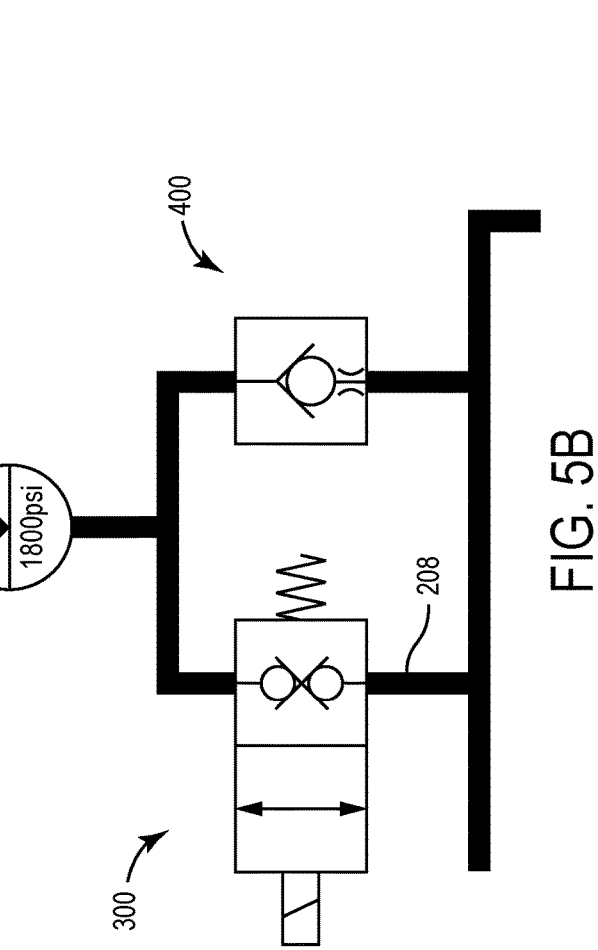
FIG. 5A
FIG. 5B
FIG. 5C

ORIFICED CHECK VALVE IN WING CIRCUIT

FIELD OF THE DISCLOSURE

The present disclosure relates to agricultural harvesters, and, more particularly, to a system configured to facilitate hydraulic locking of a harvester header having pivoting wings using a blocker valve with an open free flow state and an orificed check valve state.

BACKGROUND

Crop harvesting is commonly performed by a harvesting system comprising a combine harvester ("combine") equipped with a removable header designed for harvesting crops. In an attempt to increase the throughput of such harvesting systems, combines are being paired with increasingly wider headers. However, although the increased span of such wider headers may improve throughput by increasing the rate at which ground can covered by the harvesting system, the increased width of the header may result in a decrease in crop yield efficiency. In particular, given the rigid, flat configuration of headers typically used in such harvesting systems, the increased inability of wider, rigid frame header to conform to variations in terrain often results in a decrease in the amount of crop that is harvested as the harvesting system travels over uneven terrain.

Additionally, increasing the width of the header of a harvesting system often increases the structural loads imparted by the heavier, wider header onto the combine. As a result, many combines that are used in such wider header harvesting systems incorporate reinforced combine structures configured to support the added weight of a wider header and to withstand and resist the increased dynamic loads that such wider headers impart. In addition to increasing the material costs required to manufacture such reinforced combines, the added mass of such reinforced combines also typically increases the costs of operating the harvesting system.

SUMMARY

One implementation of the present disclosure is a wing locking system for a harvesting header. The wing locking system includes an accumulator, a fluid cylinder operably attached to a wing of the harvesting header, a hose fluidly connecting the accumulator and the fluid cylinder, and a valve operably disposed between the accumulator and the fluid cylinder. The valve includes a first selectable position configured to permit a first fluid flow rate between the accumulator and the fluid cylinder and a second selectable position configured to permit a second fluid flow rate from the accumulator to the fluid cylinder. The first fluid flow rate is greater than the second fluid flow rate.

The second selectable position of the valve may permit fluid flow from the accumulator to the fluid cylinder through an orificed check valve and may prevent fluid flow from the fluid cylinder to the accumulator. When the valve is in the second selectable position, the flow of fluid into the fluid cylinder may be configured to constrain an upward pivot angle of the wing. In some embodiments, the valve may be in the second selectable position when the harvesting header encounters a negative loading condition. The upward pivot angle of the wing may range from 0.05° to 1.0°. In other embodiments, the valve may be in the second selectable position when the harvesting header is in an integrated transport configuration. The upward pivot angle of the wing may range from 1.0° to 10.0° and may be constrained by a limitation of the fluid cylinder.

Another implementation of the present disclosure is method of operating a harvesting header. The harvesting header includes a center section, a left wing hingedly attached to the center section, a right wing hingedly attached to the center section, and a wing locking system. The wing locking system includes an accumulator, a fluid cylinder operably attached to at least one of the left wing and the right wing, a hose fluidly connecting the accumulator and the fluid cylinder, and a valve operably disposed between the accumulator and the fluid cylinder. The valve includes a first selectable position configured to permit a first fluid flow rate between the accumulator and the fluid cylinder and a second selectable position configured to permit a second fluid flow rate from the accumulator to the fluid cylinder. The first fluid flow rate is greater than the second fluid flow rate. The method further includes operating the valve in the second selectable position during at least one of a transient negative loading condition and a sustained negative loading condition caused by an integrated transport configuration of the harvesting header.

The second selectable position may permit fluid flow from the accumulator to the fluid cylinder through an orificed check valve and may prevent fluid flow from the fluid cylinder to the accumulator. In some embodiments, the flow of fluid from the hose into the fluid cylinder may cause at least one of the left wing and the right wing to pivot upwards relative to the center section by between approximately 0.05° and approximately 1.0° during the transient negative loading condition of the harvesting header. In other embodiments, the flow of fluid from the hose into the fluid cylinder may cause at least one of the left wing and the right wing to pivot upwards relative to the center section by between approximately 1.0° and approximately 10.0° during the sustained negative loading condition caused by the integrated transport configuration of the harvesting header.

In some embodiments, when the valve is in the first selectable position, the flow of fluid into the fluid cylinder and out of the fluid accumulator and out from the fluid cylinder and into the fluid accumulator may be configured to allow the fluid cylinder to move the at least one wing within a first range along a wing trajectory. When the valve is in the second selectable position, the flow of fluid out from the fluid accumulator into the fluid cylinder may be configured to allow the fluid cylinder to move the at least one wing within a second range along the wing trajectory. The second range may be smaller than the first range.

In some embodiments, the transient negative loading condition may be caused by uneven terrain. In other embodiments, the transient negative loading condition may be caused by flexure of a trailer transporting the harvesting head. In further embodiments, when the harvesting head is in the integrated transport configuration, the harvesting head may be supported by structural members and ground engaging wheels.

Yet another implementation of the present disclosure is a harvester system. The harvester system includes a center section, a left wing hingedly attached to the center section, a right wing hingedly attached to the center section, and a wing locking system. The wing locking system includes an accumulator, a fluid cylinder operably attached to at least one of the left wing and the right wing, a hose fluidly connecting the accumulator and the fluid cylinder, and a valve operably disposed between the accumulator and the fluid cylinder. The valve includes a first selectable position configured to permit a first fluid flow rate between the accumulator and the fluid cylinder and a second selectable position configured to permit a second fluid flow rate from the accumulator to the fluid cylinder. The first fluid flow rate is greater than the second fluid flow rate.

The second selectable position of the valve may permit fluid flow from the accumulator to the fluid cylinder through an orificed check valve and may prevent fluid flow from the fluid cylinder to the accumulator. In some embodiments, the flow of fluid from the hose into the fluid cylinder may cause at least one of the left wing and the right wing to pivot upwards relative to the center section by between approximately 0.05° and approximately 1.0° during a transient negative loading condition. In other embodiments, the flow of fluid from the hose into the fluid cylinder may cause at least one of the left wing and the right wing to pivot upwards relative to the center section by between approximately 1.0° and approximately 10.0° during a sustained negative loading condition caused by an integrated transport configuration of the harvesting header. In further embodiments, the harvester system may include structural members and ground engaging wheels.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 5A-5C are simplified general block diagrams illustrating a blocker valve, according to some embodiments.

DETAILED DESCRIPTION

Referring generally to the FIGURES, a suspension system 200 for a harvester 100 configured to reduce structural loads is shown. As will be described in more detail below, suspension system 200 is configured as a variable spring rate suspension system, which allows the header 104 to more closely and easily follow terrain while the harvester 100 is in a harvesting mode, while also providing the header 104 with the ability to flex during an elevated, non-harvesting transport configuration of the header 104. In doing so, the suspension system 200 reduces the structural loads that the combine 102 supporting the header 104 is subject to during operation of the harvester 100. As such, the suspension system 200 allows the width of the header 104 to be increased (so as to, e.g., increase harvesting throughput) without requiring reinforcement of the structure of the combine 102 to support the increased mass of the wider header 104.

Figure 1A:
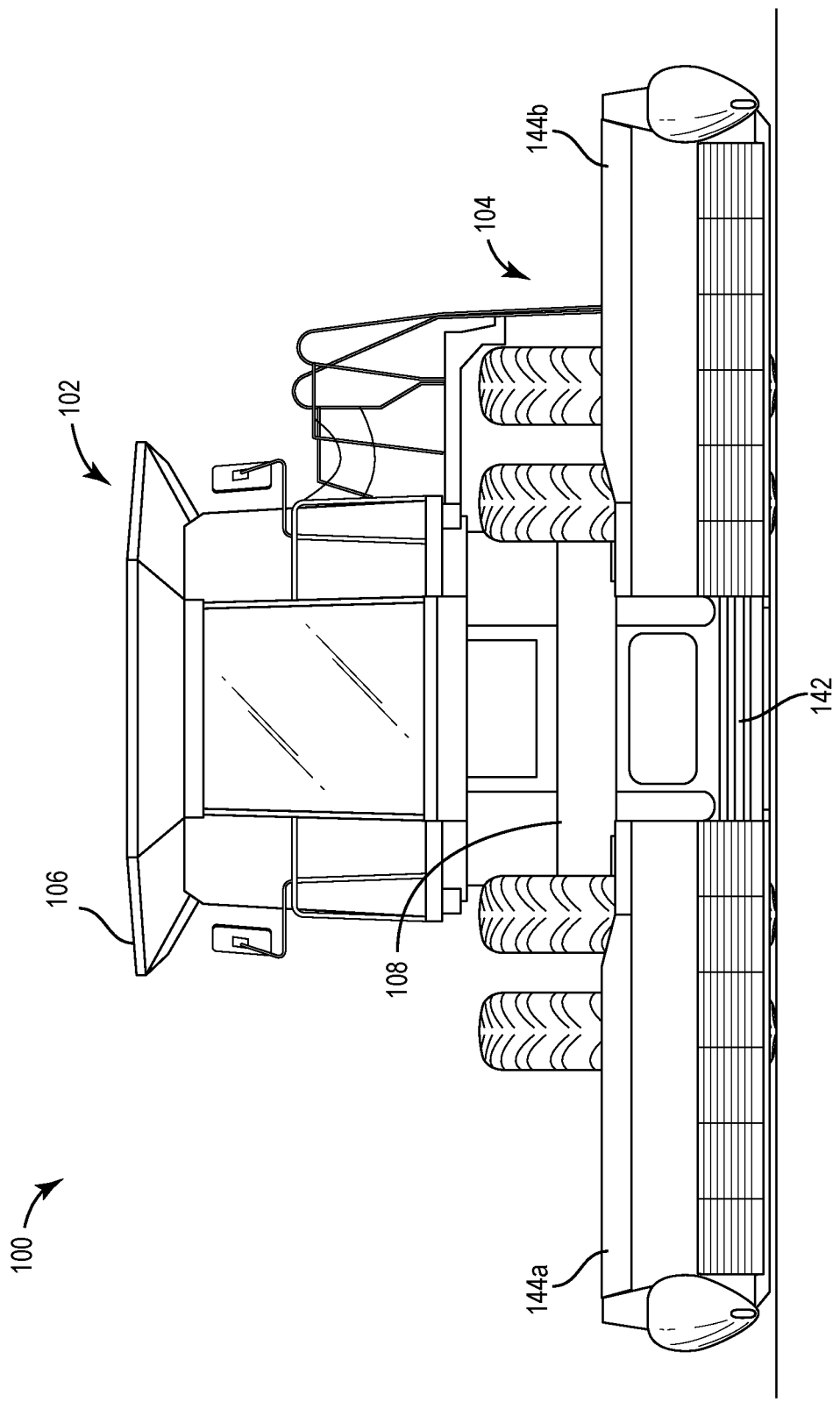
FIGS. 1A-1C illustrate a harvester in a harvesting configuration travelling over different types of terrain, according to some embodiments.
Figure 1B:
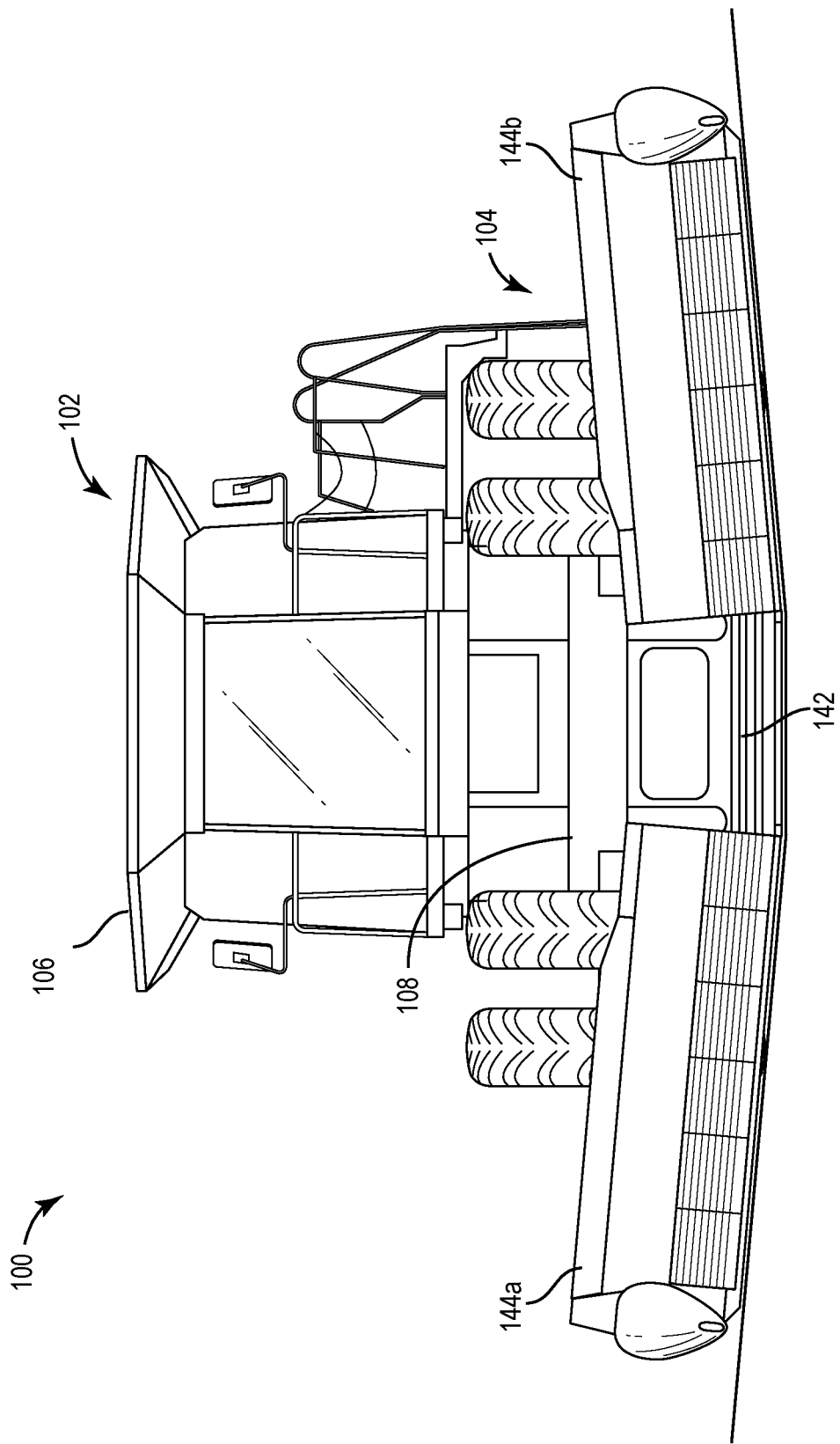
Figure 1C:
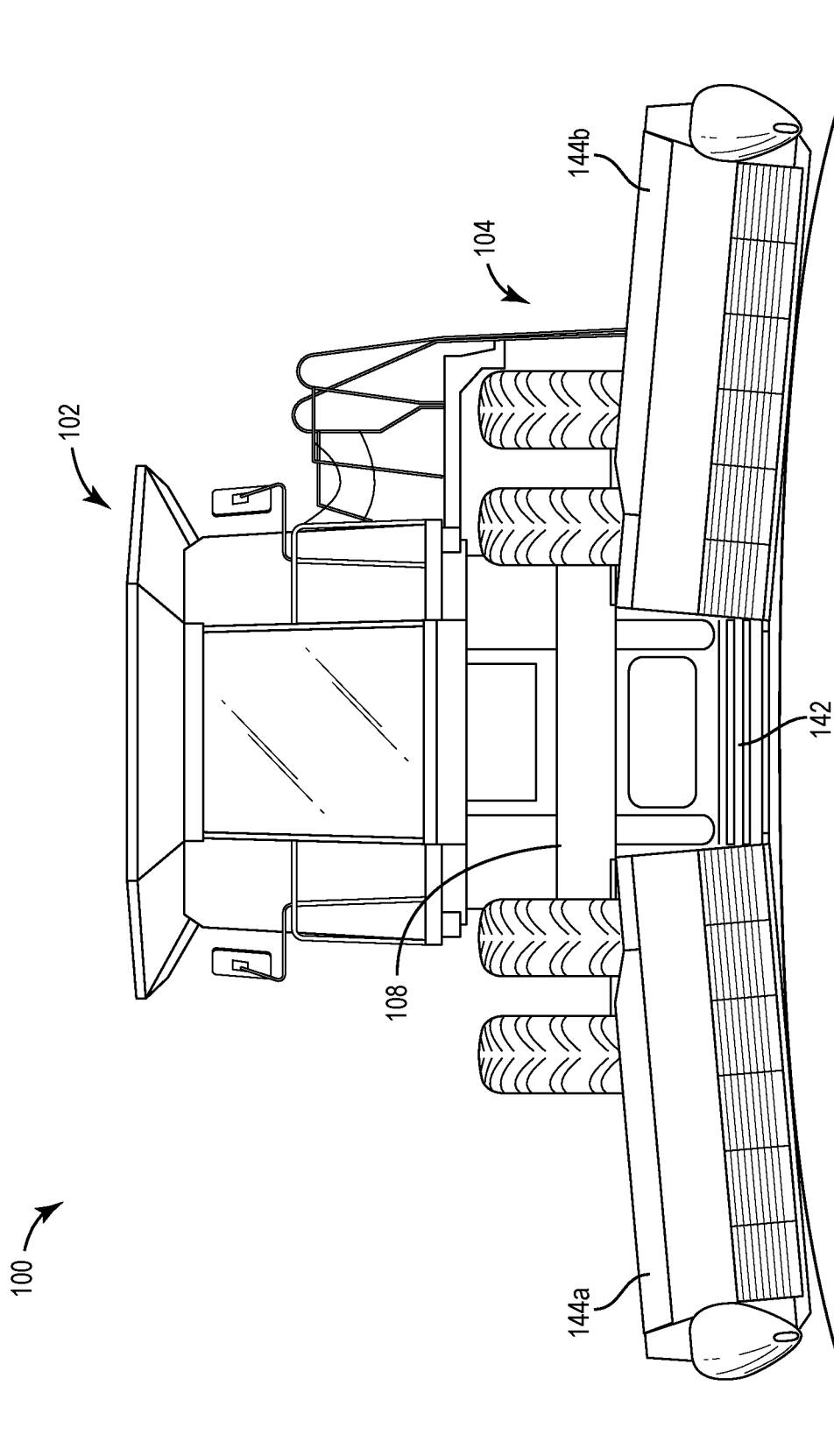

Referring to FIGS. 1A-1C, an agricultural harvester 100 according to one embodiment is shown in various harvesting configurations as the harvester 100 travels over terrain having varying contours. As illustrated in FIGS. 1A-1C, according to various embodiments, the harvester 100 includes a combine 102 and an agricultural harvesting header 104 supported on the front of the combine 102.

Figure 2:
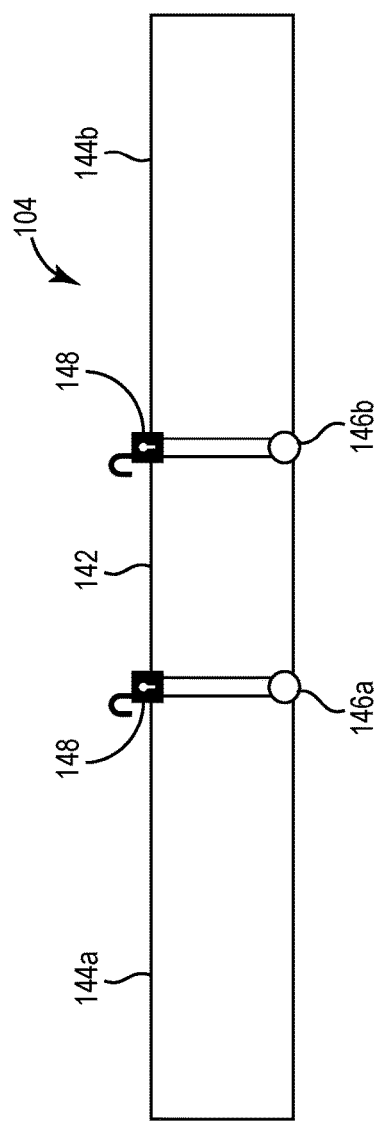
FIG. 2 is a simplified block diagram illustrating a top view of a header, according to some embodiments.

As illustrated by the simplified block diagram of FIG. 2, according to various embodiments, the header 104 defines an articulated structure comprising a center section 142 to which a left wing 144a is hingedly connected by a left hinge joint 146a and to which a right wing 144b is hingedly connected by a right hinge joint 146b. The connection of the left wing 144a to the center section 142 via left hinge joint 146a allows the left wing 144a to pivot upwards or downwards relative to the center section 142 about a generally horizontal axis along which the left hinge joint 146a extends. Similarly, the connection of the right wing 144b to the center section 142 via right hinge joint 146b allows the right wing 144b to pivot upwards or downwards relative to the center section 142 about a generally horizontal axis along which the right hinge joint 146b extends. As will be understood, given the independent hinged attachment of each of the left wing 144a and the right wing 144b to the center section 142, the left wing 144a may pivot in any direction (i.e. upwardly or downwardly) and to any degree, irrespective of any pivoting of the right wing 144b about the center section 142, and vice versa.

Although, as described below, the harvester 100 comprises a suspension system 200 configured to maintain the header 104 in a generally flat configuration, according to some embodiments, such as, e.g., illustrated in FIG. 2, a manually or automatically actuated lock 148 may be provided between left wing 144a and center section 142 and/or between right wing 144b and center section 142 which may optionally be used in situations in which a user may desire to fixedly and rigidly restrain the pivoting movement of left wing 144a and/or right wing 144b relative to the center section 142.

As the harvester 100 transitions from travelling along generally flat terrain (during which the center section 142, left wing 144a and right wing 144b each extend along a generally horizontal plane, such as, e.g., illustrated in FIG. 1A, that is substantially parallel to the terrain on which the header 104 is supported) to uneven terrain, the hinged connections of the left wing 144a and right wing 144b to the center section 142 allow the header 104 to more closely adapt to and conform to the contours of the variable terrain (such as, e.g., illustrated in FIGS. 1B and 1C).

In addition to increasing crop yield, by allowing the left wing 144a and right wing 144b to independently flex and adapt to changing terrain, the mass of the header 104 that is accelerated as the header 104 travels over uneven terrain is decreased, thereby minimizing the structural loads on the combine 102. Thus, the articulated configuration of the header 104 allows the width of the header 104 to be increased (as compared to a rigid, non-articulated header) without necessarily resulting in increased stress on the combine 102, thereby obviating the need to reinforce the combine 102 to support the wider width header 104.

The combine 102 generally includes a combine harvester vehicle 106 and feederhouse 108 pivotally attached about a rear end to a lower portion of the combine harvester vehicle 106 (such as, e.g., to a chassis of the harvester vehicle 106). A forward end of the feederhouse 108 is configured to support the header 104. According to various embodiments, one or more feederhouse actuators (not shown) are operably coupled between the rear end of the feederhouse 108 and the combine harvester vehicle 106. The feederhouse actuators may comprise any number of known actuator arrangements, with selective manual and/or automatic activation of the feederhouse actuator(s) being configured to cause the rear end of the feederhouse 108 to pivot relative to the combine harvester vehicle 106, thereby resulting in a vertical movement of the forward end of the feederhouse 108, as well as the resultant vertical movement of the attached header 104, in an upwards or downwards direction, such as illustrated, e.g., in FIG. 3.

Figure 3:
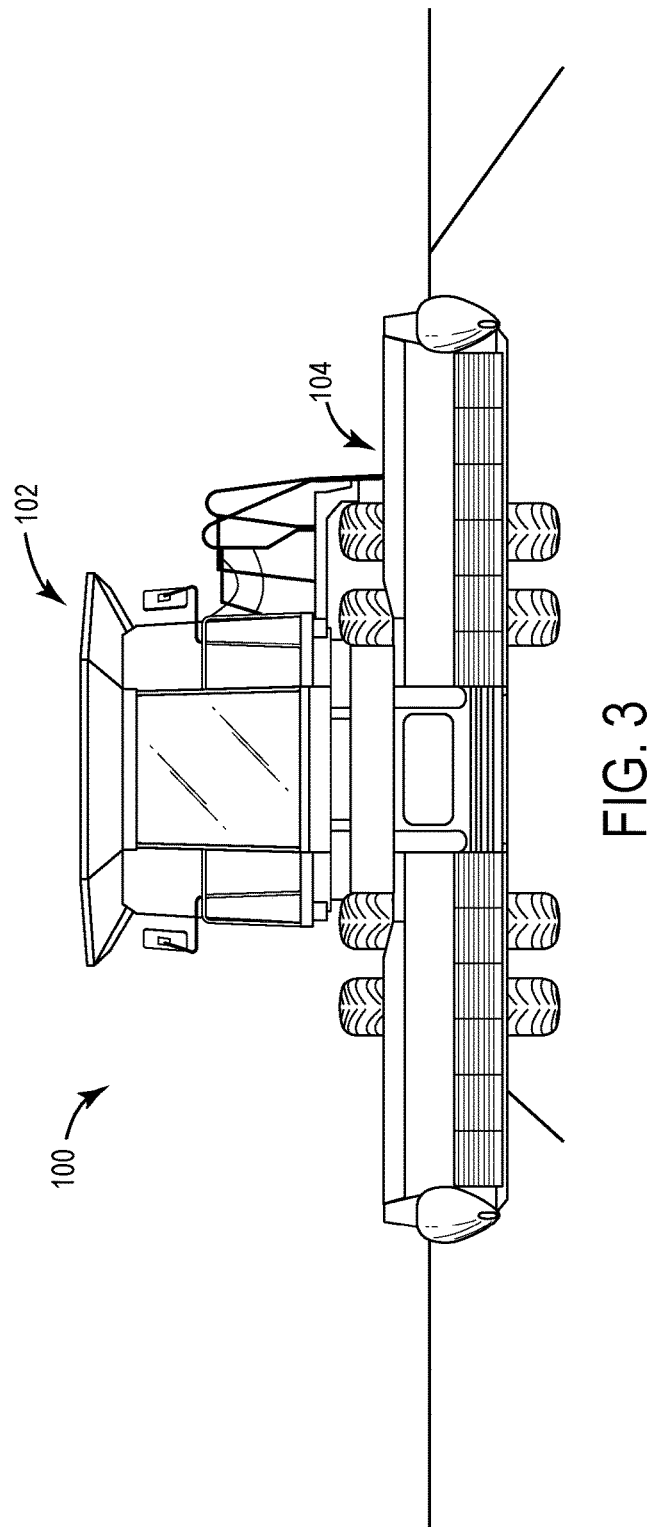
FIG. 3 illustrates a harvester in a non-harvesting transport configuration, according to some embodiments.

As will be understood, the activation of these feederhouse actuators may allow the harvester 100 to transition between a harvesting configuration in which the weight of the header 104 is at least partially supported by the ground, to a non-harvesting transport configuration in which the header 104 is elevated with reference to the ground (and in which configuration the weight of the header 104 is supported entirely by the combine 102), such as, e.g., illustrated in FIG. 3.

In light of the articulated configuration of the header 104, when feederhouse actuator(s) are activated to raise the header 104 to an elevated, non-harvesting transport configuration such as shown in FIG. 3, the hinged attachment of left wing 144a and right wing 144b ("together, wings 144") to center section 142 via left hinge joint 146a and right hinge joint 146b, respectively, may cause the outermost ends of wings 144 to sag relative to the height of center section 142. As will be understood, the amount of downward displacement or sag of the outermost ends of the wings 144 as measured relative to the center section 142 increases as the width of the wings 144 is increased.

As described above, the ability of wings 144 to pivot substantially relative to center section 142 may advantageously allow the header 104 to conform to the terrain during harvesting. However, such substantial pivoting movement of the wings 144 relative to the center section 142 may be undesirable when the header 104 is in an elevated position (e.g., when the harvester 100 is being turned around on end rows or during non-harvesting transport of the harvester 100). In particular, leaving the wings 144 unsupported and free to pivot relative to center section 142 while the header 104 is elevated may cause the outermost ends of wings 144 to fully lower, thereby decreasing clearance to the ground even when the header 104 is in a fully raised configuration, which may allow inadvertent contact between the ground and header 104 that could damage the header 104.

Although preventing sagging of the outermost ends of the wings 144 in order to maintain a substantially flat profile of the header 104 may be desirable when the header 104 is in an elevated configuration such as, e.g., illustrated in FIG. 3—for reasons as described with reference to rigid frame, non-articulated headers above—it may be undesirable to lock or otherwise fix the wings 144 into a substantially rigid configuration in an attempt to prevent the outermost ends of wings 144 from doing so. In particular, locking or otherwise restricting movement of the wings 144 relative to the center section 142 during an elevated configuration of the header 104 (such as, e.g., during non-harvesting transport of the harvester 100) may undesirably increase the dynamic loads that are imparted by the header 104 onto the combine 102.

Instead, as will be described in more detail below, the harvester 100 is advantageously provided with a suspension system 200 that allows for some degree of pivoting movement of the wings 144 of the header 104 relative to the center section 142 while also supporting the header 104 in a substantially flat profile during field transport of the harvester 100 (i.e. when the header 104 is lifted entirely off of the ground). In doing so, the suspension system 200 minimizes the amount of header 104 inertia that must be accelerated when encountering bumps in terrain, thereby reducing the forces imparted on the combine 102 during travel of the harvester 100 with the header 104 in an elevated configuration.

Accordingly, in various embodiments, the harvester 100 is provided with a variable spring rate suspension system 200 configured to prevent the amount of downward displacement of the outermost ends of the wings 144 relative to the center section 142 when the header 104 is in an elevated configuration and to allow the hingedly attached wings 144 to pivot as needed relative to the center section 142 while the harvester 100 is in a harvesting configuration (i.e. when the header 104 is at least partially supported along the ground), thus minimizing the structural loading of the combine 102 by the header 104. As such, the suspension system 200 may allow the harvester 100 to incorporate a wider header 104 for more efficient harvesting throughput without requiring a reinforced combine 102 structure to support the wider width header 104.

More specifically, according to various embodiments, when the harvester 100 is in a harvesting configuration (i.e. when the header 104 is at least partially supported by the ground, such as, e.g., illustrated in FIGS. 1A-1C) the suspension system 200 of the harvester 100 is configured to allow for upward and downward pivoting of the wings 144 by approximately no more than ±15.0°, more specifically by approximately no more than ±10.0°, and more specifically by approximately no more than ±5.0° as measured relative to the lateral axis along which the center section 142 extends. When the harvester 100 is an elevated, non-harvesting transport position (i.e. when the header 104 is elevated such that the mass of the header 104 is not supported by the ground), the suspension system 200 is configured such that the upwards or downwards pivoting of the wings 144 is constrained to between approximately 10% and 30%, more specifically between approximately 15% and 25%, and even more specifically between approximately 20% of the range through which the wings 144 are allowed to pivot when the harvester 100 is in the harvesting configuration, such that the upward and downward pivoting of the wings 144 as measured relative to the lateral axis along which the center section 142 extends is approximately no more than ±4.5°, more specifically is no more than approximately ±2.5°, and even more specifically no more than approximately ±1.0° when the harvester 100 is in a non-harvesting transport position (such as, e.g., illustrated in FIG. 3). By constraining the upward or downward pivoting of the wings 144 during harvesting and non-harvesting transport configurations in such a manner, the suspension system 200 is configured to allow for between an approximately 10% to approximately 20% reduction in the stress imparted onto the combine 102 by the articulated header 104, as compared to the structural load that would be imparted by a rigid, non-articulated header 104 having a similar width and mass.

As will be understood, the suspension system 200 may be defined by any number of and combination of different components that are arranged in a manner to allow for the selective constraint of the movement of the wings 144 relative to the center section 142 according to first and second variable states. In particular, in the first variable state, the suspension system 200 is configured such that movement of the wings 144 is constrained to a first range (such as, e.g., described with reference to the harvesting configuration above). Meanwhile, in the second variable state, the suspension system 200 is configured such that movement of the wings 144 is constrained to a second range that is less than the first range (such as, e.g., described with reference to the non-harvesting transport configuration above).

For example, according to some embodiments (not shown), suspension system 200 may comprise a first set of coiled springs positioned about the left wing 144a and a second set of coils positioned about right wing 144b. Each of the first set and second set of coils comprise a first spring and a second spring. One or both of the length of the first spring and/or spring constant of the first spring differs from the second spring, such that the spring force of the first spring is greater than the spring force of the second spring. The first and second springs are configured to be independently engageable, such that, when the first spring is engaged, the pivoting movement of the wings 144 about center section 142 of the header 104 is constrained to a smaller range of motion than when the first spring is disengaged, and the second spring is engaged.

Accordingly, in such embodiments, by selectively engaging the second springs, the suspension system 200 may provide the wings 144 with sufficient ability to pivot about center section 142 so as to allow the wings 144 to adapt to the contours of changing terrain when the harvester 100 is in harvesting position. Meanwhile, by selectively engaging the first springs, the suspension system 200 may be configured to allow for more constrained movement of the wings 144 relative to the center section 142, thereby minimizing the degree of displacement of the outermost ends of the wings 144 relative to the center section 142 (and thereby minimizing the risk of the outermost ends inadvertently contacting the ground when the header 104 is in an elevated, transport position) while also providing the wings 144 with sufficient flexibility to pivot so as to minimize the dynamic loads on the combine 102 during non-harvesting transport of the harvester 100 (such as, e.g., illustrated in FIG. 3).

Alternatively, in other coiled spring embodiments of suspension system 200, a single coiled spring may be positioned about each of the left wing 144a and the right wing 144b. The suspension system 200 may further comprise a length adjusting mechanism associated with each of the left wing 144a and right wing 144b, which is selectively actuatable to increase or decrease the effective length of the coiled spring. During non-harvesting transport with the header 104 in an elevated transport position, the length adjusting mechanisms may be actuated to effectively shorten the lengths of the springs, thereby increasing the spring force of the springs and minimizing the freedom of the wings 144 to pivot relative to center section 142. Meanwhile, when in the harvesting position, the length adjusting mechanisms may be actuated to effectively lengthen the springs, thereby decreasing the spring forces of the springs and increasing the degree to which the wings 144 may pivot. As will be understood, according to various embodiments, the length adjusting mechanisms may be configured to allow the effective lengths of the springs to vary between first and second fixed lengths, while in other embodiments, the length adjusting mechanisms may be configured to allow the effective lengths of the springs to be varied as desired, thus allowing for greater or lesser degrees of constraint of the movement of the wings 144 relative to the center section 142 of the header 104 during different non-harvesting transport and/or harvesting uses of the harvester 100. Additionally, while in some such embodiments the length adjusting mechanisms of the wings 144 may be actuated by the suspension system 200 in tandem with one another, in other embodiments, the length adjusting mechanisms may be actuated independent of one another, such that the degree to which movement of the left wing 144a is constrained may vary from the degree to which movement of the right wing 144b is constrained, and vice versa.

In yet other embodiments, the suspension system 200 may comprise a hydraulic system configured to provide for first and second variable states which selectively allow for differing degrees of pivoting of the wings 144 relative to the center section 142. For example, in some embodiments (not shown), the suspension system 200 may comprise a pair a hydraulic circuits that are operably provided for each of the left wing 144a and right wing 144b, with a first circuit having a different volume and/or pressure of fluid than a second, distinct circuit defining the pair of hydraulic circuits.

Figure 4:
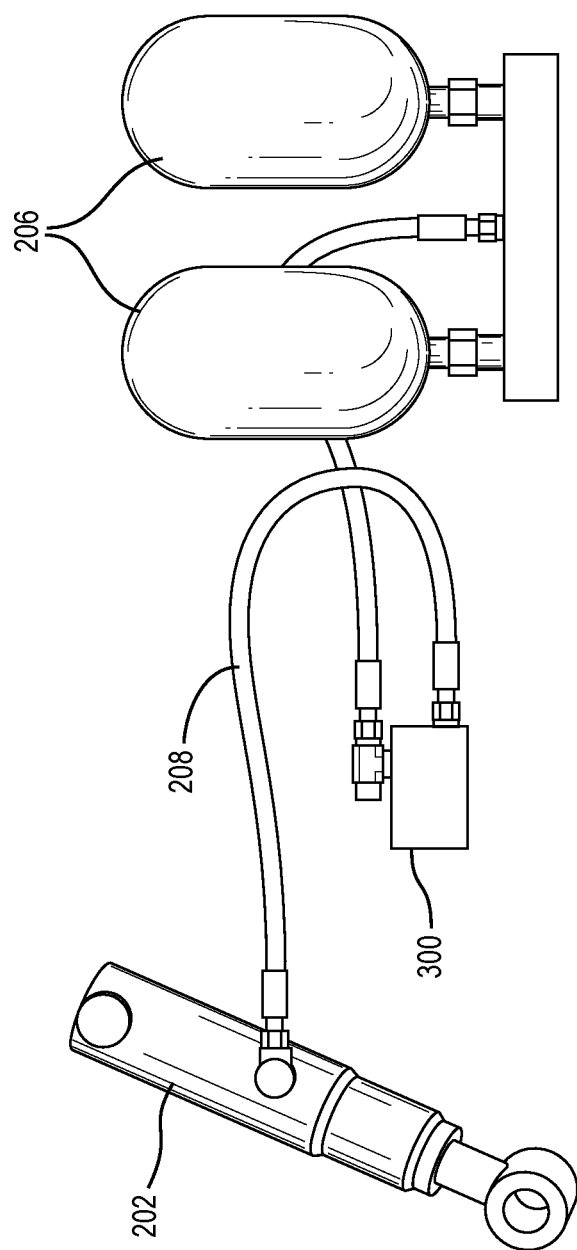
FIG. 4 is a simplified general block diagram illustrating a suspension system, according to some embodiments.

Referring to FIG. 4, a simplified schematic of a hydraulic based spring suspension system 200 comprising a blocker valve 300 which is configured to provide for first and second variable states according to one embodiment is illustrated. The suspension system 200 illustrated in FIG. 4 corresponds to one of the left wing 144a or right wing 144b of the header 104, with the other of the left wing 144a or right wing 144b being provided with a substantially similar, albeit mirrored, suspension system 200 as shown in and described with reference to FIG. 4.

Suspension system 200 generally comprises a fluid cylinder 202 that is fluidly connected to one or more accumulators 206 via an attenuation hose 208. The accumulators 206 are configured to store a volume of pressurized fluid (such as, e.g., incompressible hydraulic fluid) that is supplied to the fluid cylinder 202 via the attenuation hose 208. As fluid flows into or out from the fluid cylinder 202, the fluid cylinder 202 is configured to extend or retract. As the fluid cylinder 202 is configured to suspend the wing 144 (i.e., one of left wing 144a and/or right wing 144b), the retraction and extension of the fluid cylinder 202 in response to changes in the amount of fluid within fluid cylinder 202 causes the wing 144 to move pivotably about the center section 142, resulting in the upward or downward movement of the wing 144 relative to the center section 142.

A blocker valve 300 is fluidly disposed between the fluid cylinder 202 and the accumulators 206. As will be described with more detail with reference to FIGS. 6A-9B below, the blocker valve 300 is configured to allow for selective flow of fluid between the fluid cylinder 202 and the accumulators 206, allowing the fluid cylinder 202 to provide varying degrees of suspension of the wing 144, which in turn allows the suspension system 200 to provide for first and second variable states that selectively allow for differing degrees of pivoting of the wings 144 relative to the center section 142.

As shown in FIG. 4, the accumulators 206 are additionally fluidly connected to a hydraulic block 210, which serves as a source of fluid for the accumulators 206. Fluid from the hydraulic block 210 is supplied to the accumulators 206 in response to the selective activation of a valve 212 to permit flow between the hydraulic block 210 and accumulators 206. Once sufficient fluid has been allowed to fill the accumulators 206 to a desired pressure, the valve 212 may be activated to a closed configuration. As will be understood, according to some embodiments, a single hydraulic block 210 may be common to the suspension systems 200 of both the left wing 144a and the right wing 144b, while in other embodiments, the suspension systems 200 of each of the left wing 144a and the right wing 144b may comprise distinct, individual hydraulic blocks 210.

Referring to FIGS. 5A-5C, a blocker valve 300 according to various embodiments is illustrated. In general, the blocker valve 300 is selectively activatable between a flow position, defined by a flow structure 302 and a restricted flow position defined by a flow-restriction structure 304. As will be understood, blocker valve 300 may be biased to either the flow position or restricted-flow position, and may be selectively energized or otherwise activated between the flow and restricted flow positions according to any number of different arrangements, including mechanical and/or electromechanical arrangements.

Additionally, while in some embodiments the activation of the blocker valve 300 between the flow position and the restricted-flow position may be controlled directly by the operator as desired, according to other embodiments, the activation of the blocker valve 300 may be controlled by a control system of the harvester 100. For example, according to some embodiments, the harvester 100 may comprise a control system, which, in addition to controlling other aspects of the operation of the harvester 100, may additionally be configured to control the activation of the blocker valve 300. According to some such embodiments, the control system may be configured to automatically activate the blocker valve 300 to the restricted-flow position upon the control system exiting out of an auto-header height mode of the control system and/or in response to the feederhouse 108 (and attached header 104) being lifted up and elevated with respect to the ground. In yet other embodiments, the control system may be configured such that, when the harvester 100 is operated in a manual mode, the blocker valve 300 is automatically activated to a restricted-flow position upon the control system receiving a signal from ground detection sensors that the header 104 has been elevated off of the ground.

When the blocker valve 300 is in the restricted-flow position, fluid present within the fluid cylinder 202 and attenuation hose 208 is prevented from flowing into the accumulators 206. However, as will be described in more detail below with reference to FIGS. 10A-12B, according to some embodiments, it may be advantageous to allow for a limited degree of fluid flow from the accumulators 206 into the attenuation hose 208 and fluid cylinder 202. Accordingly, as shown in FIG. 5A, according to some embodiments, the flow-restriction structure 304 of blocker valve 300 may comprise an orificed check valve structure 400, which is configured to restrict flow from the attenuation hose 208 and fluid cylinder 202 into the accumulators 206, but which allows for flow from the accumulators 206 into the attenuation hose 208, even when the blocker valve 300 is in the restricted flow position.

In other embodiments, it may be desired that there be no flow in either direction (i.e. no flow of fluid into or out of the accumulators 206) when the blocker valve 300 is in the restricted flow position. According to some such embodiments, the flow-restriction structure 304 of blocker valve 300 may comprise a double-checked valve structure (such as, e.g., illustrated in FIG. 5B) or other structure configured to prevent flow in either direction through the blocker valve 300.

As shown in FIG. 5C, in some embodiments in which the blocker valve 300 comprises a flow-restriction structure 304 configured to prevent flow in either direction through the blocker valve 300 (such as, e.g., a double-checked valve flow-restriction structure 304), the suspension system 200 may include an orificed check valve structure 400 arranged fluidly in parallel with the blocker valve 300. By providing an alternate fluid path through which fluid from the accumulators 206 may flow into the attenuation hose 208, the orificed check valve structure 400 may allow for restricted flow of fluid from the accumulators 206 into the attenuation hose 208 even when the blocker valve 300 is in the restricted-flow position.

The ability of the suspension system 200 to provide for first and second variable states which selectively allow for differing degrees of pivoting of the wings 144 relative to the center section 142 will now be described with reference to FIGS. 6A-9B.

Figure 6B:
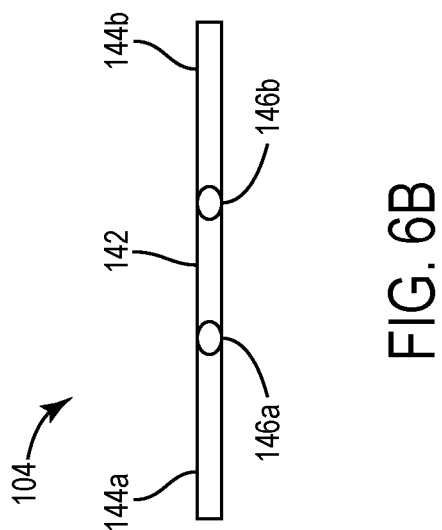
FIG. 6B is a simplified general block diagram illustrating a front view of a header during the harvesting configuration of the harvester shown in FIG. 6A, according to some embodiments.
Figure 6A:
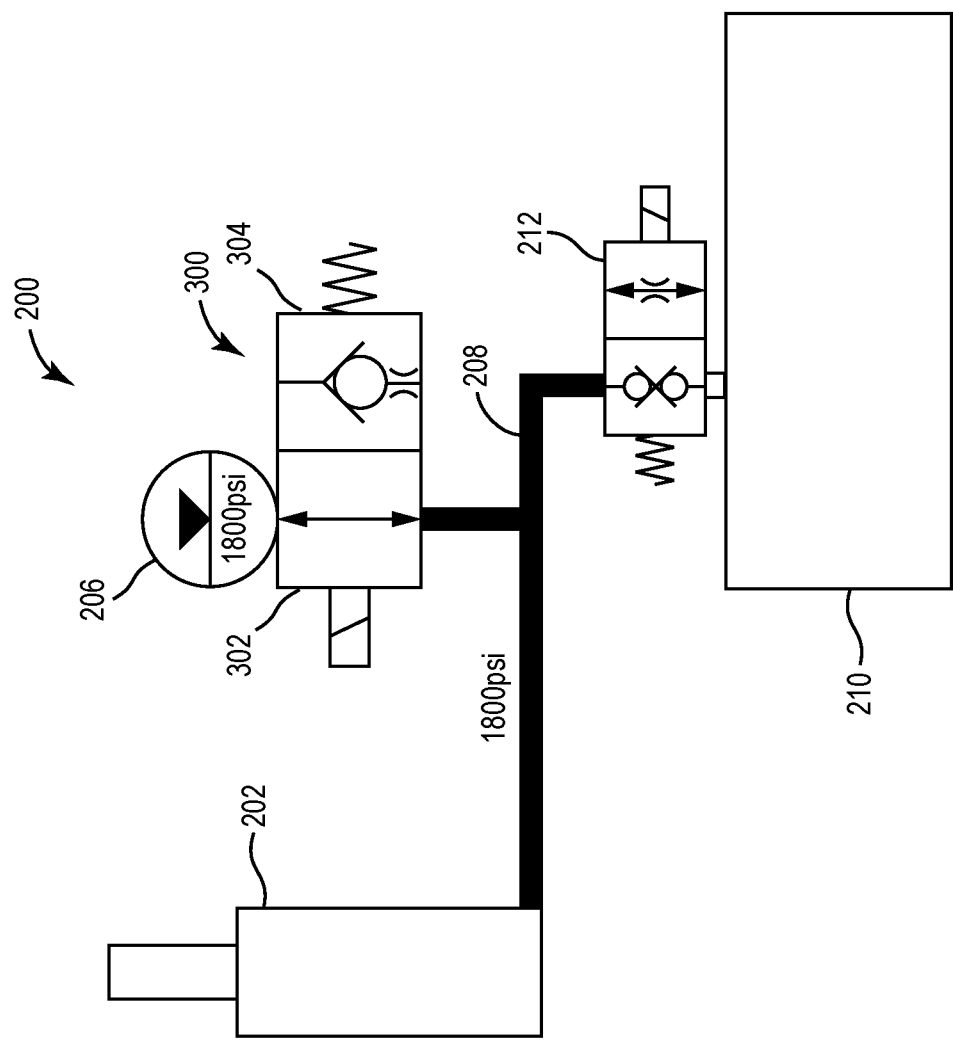
FIG. 6A is a simplified general block diagram illustrating a suspension system during a harvesting configuration of a harvester, according to some embodiments.

Referring to FIGS. 6A and 6B, a simplified block diagram of the suspension system 200 and the header 104 configuration is shown during harvesting operation of the harvester 100 according to some embodiments. As described above, during harvesting, the articulated configuration of header 104 (in which left wing 144a is hingedly attached to center section 142 via a left hinge joint 146a and in which right wing 144b is hingedly attached to center section 142 via a right hinge joint 146b) allows the wings 144 of the header 104 to pivot upward and/or downward relative to the center section 142 to allow the header 104 to more closely follow the contours of the terrain.

As shown in FIG. 6A, to facilitate the ability of the wings 144 to travel over and follow contours in terrain during harvesting operation, the blocker valve 300 is in a flow configuration in which the flow structure 302 of the blocker valve 300 is aligned between the accumulators 206 and the attenuation hose 208 so as to allow fluid to freely flow between the accumulators 206 and fluid cylinder 202. As described above, by allowing fluid to flow into and out from the fluid cylinder 202, the fluid cylinder 202 is able to extend and retract as needed in response to changes in terrain. As will be understood, according to various embodiments, a float system configured to assist the header 104 in adapting to changes in terrain (such as, e.g., by monitoring changes in pressure imparted onto the header 104 and assisting in the flow of fluid into and out from the fluid cylinder 202 so as to maintain a desired target pressure) may be incorporated into harvester 100.

Because fluid is allowed to flow freely between the accumulators 206 and fluid cylinder 202 during harvesting operation of the device, the pressure within the attenuation hose 208 will be substantially the same as the pressure within the accumulators 206. Additionally, because the mass of the header 104 is supported by the ground during harvesting, as shown by FIG. 6B, the wings 144 extending substantially parallel to ground. The simplified block diagram of FIG. 6B illustrates the header 104 when the header 104 is positioned on substantially flat terrain, and as such, the entire header 104 is shown in FIG. 6B as extending in a generally planar manner. However, as will be understood, if the simplified block diagram of FIG. 6B were to represent the header 104 along uneven terrain, the wings 144 of header 104 would be shown as extending substantially parallel to the terrain above which the wings 144 extended, such that the wings 144 would extend at non-zero degree angles relative to the center section 142.

Figure 7B:
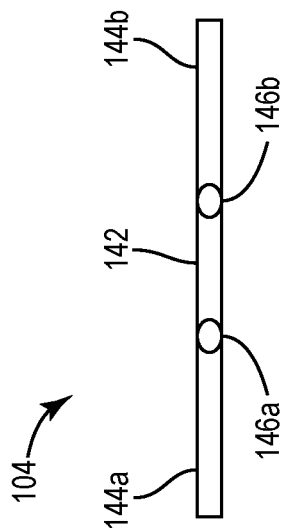
FIG. 7B is a simplified general block diagram illustrating a front view of a header during the transition configuration of the harvester shown in FIG. 7A, according to some embodiments.
Figure 7A:
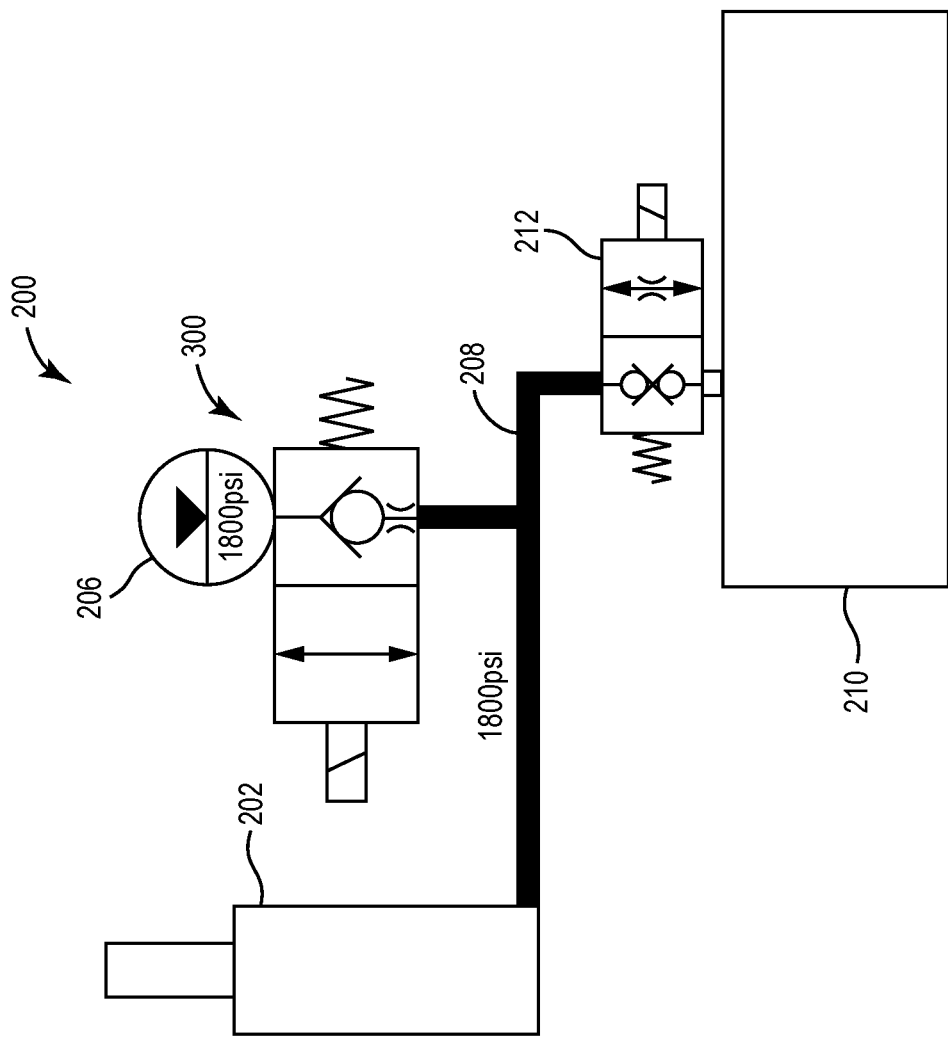
FIG. 7A is a simplified general block diagram illustrating a suspension system during a transition configuration of a harvester, according to some embodiments.

Referring to FIG. 7A, a simplified diagram of the suspension system 200 according to one embodiment is illustrated representative of a transition configuration of the harvester 100, in which the header 104 is still supported by the ground (i.e. the header 104 has not been elevated to a point where the combine 102 supports the entirety of the weight of the header 104) and in which the blocker valve 300 has been deenergized or otherwise deactivated from the flow position to the restricted-flow position.

In the transition configuration, the switching of the blocker valve 300 into the restricted-flow position prevents any fluid from flowing into or out from the accumulators 206. Upon entering into the transition configuration, the amount of fluid within the fluid cylinder 202 and attenuation hose 208 corresponds to the amount of fluid that had been present within the fluid cylinder 202 and attenuation hose 208 immediately prior to the blocker valve 300 being switched to the restricted-flow position. Accordingly, upon entering the transition configuration, the wings 144 are 'locked' in their last position prior to the harvester 100 being put into the transition configuration. The 'locked' configuration of the wings 144 may correspond to a configuration of the wings 144 in which one or both of the wings 144 extend angled upward relative to center section 142, extend angled downward relative to center section 142, and/or extend substantially parallel to center section 142. As will be understood, the configuration of the wings 144 in the 'locked' position will depend on whether the fluid cylinder 202 was in a retracted, expanded, or neutral state immediately prior to switching the blocker valve 300 into the restricted-flow configuration.

As illustrated in FIG. 7B, because the header 104 remains partially supported by the ground in the transition configuration, the wings 144 of the header 104 remain extending in a direction substantially parallel to the terrain above which the wings 144 are supported. As similarly described with reference to FIG. 6B, the header 104 that is represented by the simplified block diagram of FIG. 7B is shown in a configuration in which the header 104 is positioned atop substantially horizontal terrain. However, as will be understood, if the simplified block diagram of FIG. 7B were to represent the header 104 positioned along uneven terrain, the wings 144 of header 104 would be shown as extending substantially parallel to the surface above which the wings 144 extend, such that the wings 144 would extend at non-zero degree angles relative to the center section 142.

Figure 8B:
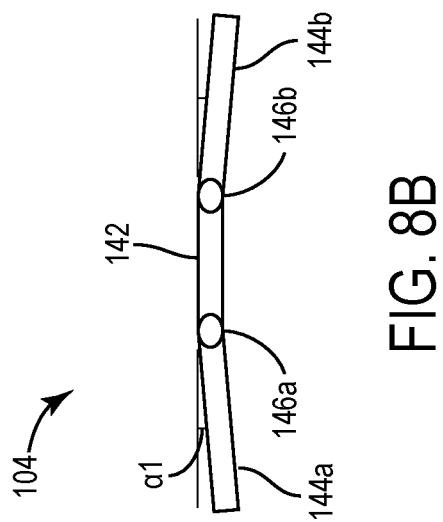
FIG. 8B is a simplified general block diagram illustrating a front view of a header during the non-harvesting transport configuration of the harvester shown in FIG. 8A, according to some embodiments.
Figure 8A:
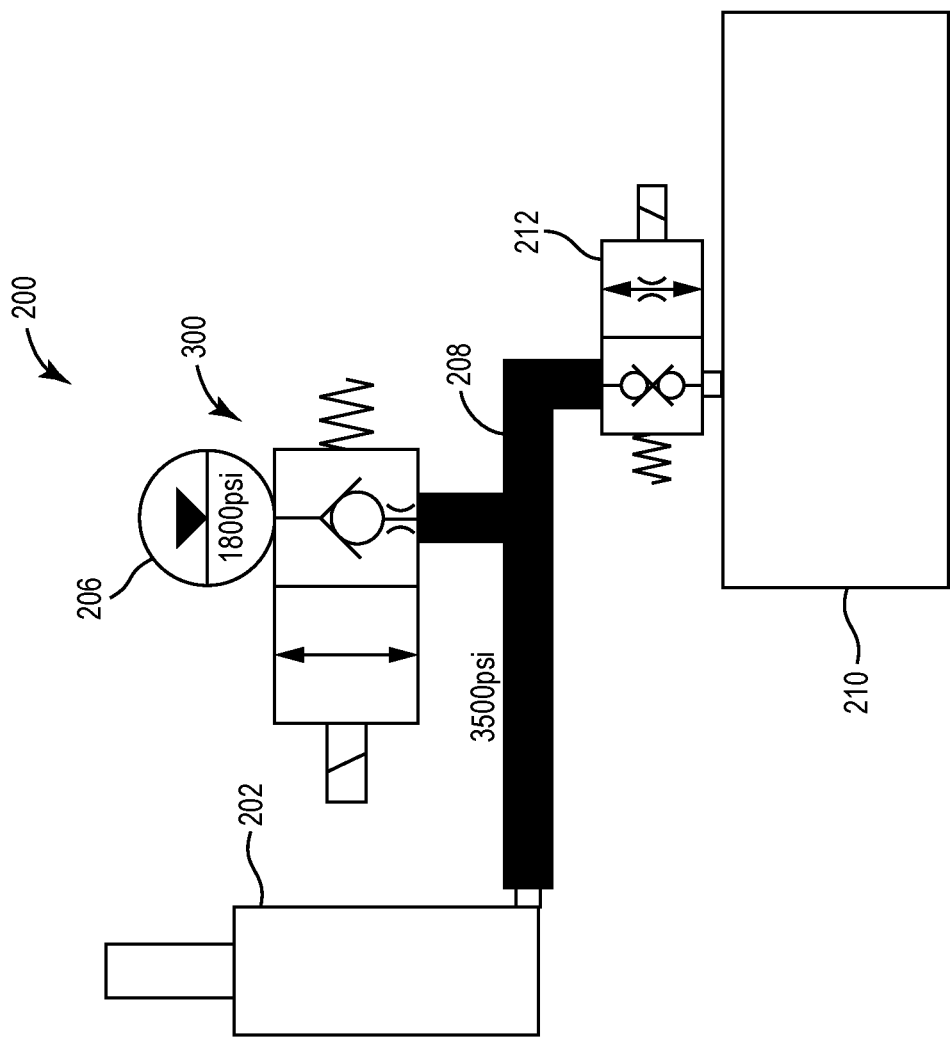
FIG. 8A is a simplified general block diagram illustrating a suspension system during a non-harvesting transport configuration of a harvester, according to some embodiments.

Referring to FIG. 8A, a simplified block diagram representative of the suspension system 200 during non-harvesting transport of the harvester 100 with the header 104 in an elevated position in which the weight of the header 104 is entirely supported by the combine 102 is shown according to one embodiment. As shown in FIG. 8A, in such an elevated, non-harvesting configuration of the header 104, the blocker valve 300 remains closed in a restricted-flow configuration, in which flow of fluid from the fluid cylinder 202 and attenuation hose 208 into the accumulators 206 is prevented.

According to various embodiments, the attenuation hose 208 is constructed with a desired degree of elasticity and resilience, which allows the attenuation hose 208 to expand to hold increased volumes of fluids as compared to an initial, neutral configuration of the attenuation hose 208. Although the flow of fluid into the accumulators 206 is prevented by the blocker valve 300, fluid is free to flow between the fluid cylinder 202 and attenuation hose 208 during the elevated, non-harvesting transport configuration of the header 104. As such, when the header 104 is elevated, causing the wing 144 to no longer be supported the ground, the elastic nature of the attenuation hose 208 is configured to allow some, or all, of the fluid that was 'locked' in the fluid cylinder 202 during the transition configuration (as described with reference to FIGS. 7A and 7B above) to flow into the attenuation hose 208, thereby increasing the volume of 'locked' fluid already present within the attenuation hose 208 (as also described with reference to FIGS. 7A and 7B above).

As representatively illustrated by the simplified block diagram of FIG. 8A, the displacement of some or all of the fluid from the fluid cylinder 202 into the attenuation hose 208 increases the pressure of the fluid within the attenuation hose 208 to a pressure that is greater than the pressure of the fluid stored within the accumulators 206. Meanwhile, as representatively illustrated by the simplified block diagram of FIG. 8B, the decrease in the volume of fluid within the fluid cylinder 202 resulting from the displacement of fluid from the fluid cylinder 202 into the attenuation hose 208 decreases the ability of the fluid cylinder 202 to suspend the wing 144, which in turn causes the wing 144 to pivot downward relative to the center section 142 by an angle of $\alpha 1$ from an initial wing 144 position defined by the position of the wing 144 in the transition configuration (which in turn, corresponds to last position of the wing 144 during the last harvesting configuration of the header 104 prior to the blocker valve 300 being switched to a restricted-flow position).

According to various embodiments, the angle $\alpha 1$ may range from approximately 0.05° to 1.5°, more specifically between approximately 0.5° and 1.0°, and even more specifically between approximately 0.6° and 0.8°. As will be understood, the angle $\alpha 1$ by which the left wing 144a is pivoted downwards relative to the center section 142 during the elevated, non-harvesting transport configuration may be the same or may be different than the angle $\alpha 1$ by which the right wing 144b is pivoted downwards relative to the center section 142 during the elevated, non-harvesting transport configuration.

Although, as shown in FIG. 8B, the wings 144 of the header 104 will exhibit some degree of sagging (i.e. pivoting of the wings 144 downwards relative to the center section 142), with respect to the initial position of the wings 144 as defined by the position of the wings 144 during the transition configuration, the position of the wings 144 during the elevated, non-harvesting transport configuration may extend at an upwards angle relative to the center section 142, generally planar with the center section 142, or at a downwards angle relative to the center section 142. As will be understood, the angle(s) relative to the center section 142 at which the wings 144 extend during the elevated, non-harvesting transport configuration will depend on factors including the angle(s) of the wings 144 relative to the center section 142 during the last harvesting configuration of the header 104 prior to the blocker valve 300 being switched to a restricted-flow position as well as the angle(s) α1 by which the wings 144 are pivoted downwards during the elevated, non-harvesting transport configuration.

According to various embodiments, as the harvester 100 is in the elevated, non-harvesting transport configuration (such as, e.g., represented in FIGS. 8A and 8B), the harvester 100 may transition to a downward flex configuration in response to the mass of the header 104 being subject to a downwards acceleration force (such as, e.g., in response to the harvester 100 travelling over uneven terrain). As such, the harvester 100 is subject to additional instantaneous loading in the downward flex configuration in addition to the sustained loading that the harvester 100 is subject to during the non-harvesting transport configuration. As illustrated in FIG. 9A, during such additional loading of the header 104 in the downward flex configuration, additional fluid flows out of the fluid cylinder 202 and into the attenuation hose 208. This additional fluid causes the volume of fluid within the attenuation hose 208 to further increase from the increased volume that the attenuation hose 208 was subject to during the elevated, non-harvesting transport configuration. As shown in FIG. 9A, as a result of this additional fluid now held within the attenuation hose 208, the pressure within the attenuation hose 208 is further increased.

Figure 9B:
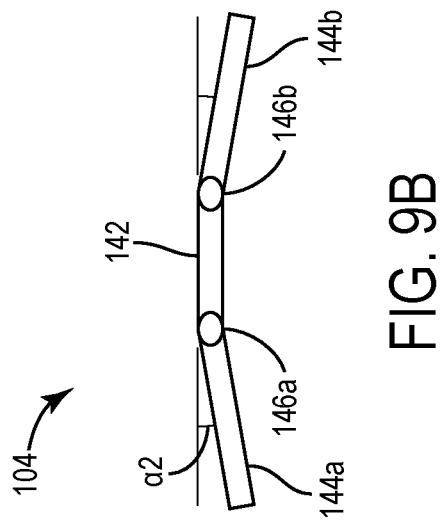
FIG. 9B is a simplified general block diagram illustrating a front view of a header during the downward flex configuration of the harvester shown in FIG. 9A, according to some embodiments.
Figure 9A:
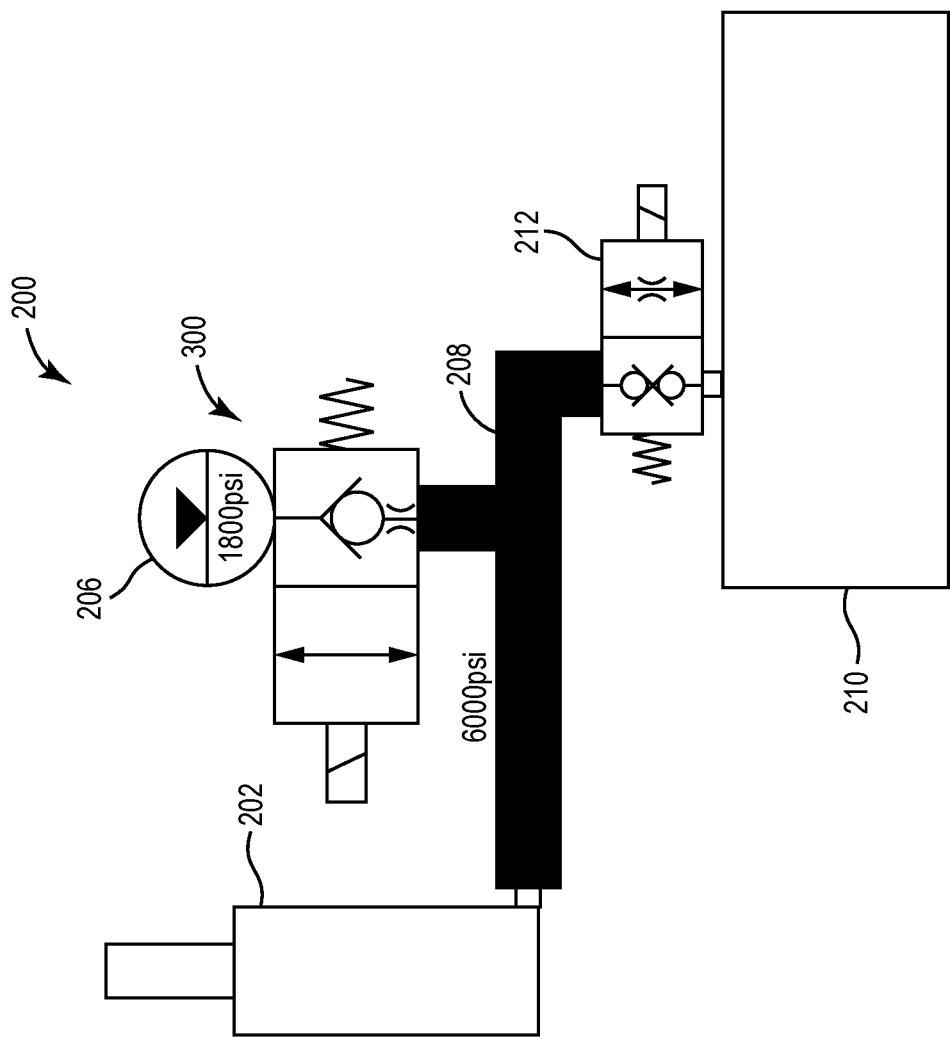
FIG. 9A is a simplified general block diagram illustrating a suspension system during a downward flex configuration of a harvester, according to some embodiments.

Meanwhile, as representatively illustrated by the simplified block diagram of FIG. 9B, the additional decrease in the volume of fluid within the fluid cylinder 202 as fluid is displaced from the fluid cylinder 202 and into the attenuation hose 208 during the downward flex configuration causes the wing 144 to pivot further downwards relative to the center section 142 by an angle of α2. According to various embodiments, the angle α2 may range from approximately 0.05° to approximately 2.0°, more specifically between approximately 0.5° and approximately 1.5°, and even more specifically by approximately 1.0°. As will be understood, the angle α2 by which the left wing 144a is pivoted downwards relative to the center section 142 during the downward flex configuration may be the same or may be different than the angle α2 by which the right wing 144b is pivoted downwards relative to the center section 142 during the downward flex configuration.

As explained with reference to FIG. 8B, although, as shown in FIG. 9B, the wings 144 of the header 104 will exhibit some degree of sagging (i.e. pivoting of the wings 144 downwards relative to the center section 142), with respect to the position of the wings 144 in the configuration immediately prior to the downward flex configuration of the header 104 (such as, e.g., the elevated, non-harvesting transport configuration of FIGS. 8A and 8B), the position of the wings 144 during the downward flex configuration may extend at an upwards angle relative to the center section 142, generally planar with the center section 142, or downwards relative to the center section 142. As will be understood, the angle(s) relative to the center section 142 at which the wings 144 extend during the downward flex configuration will depend on factors such as, e.g., the angle(s) of the wings 144 relative to the center section 142 during the last harvesting configuration of the header 104 prior to the blocker valve 300 being switched to a restricted-flow position; the angle(s) al by which the wings 144 are pivoted downwards during the elevated, non-harvesting transport configuration; the angle(s) α2 by which the wings 144 are pivoted downwards during the downward flex configuration; etc.

As illustrated by FIGS. 6A-9B, the ability of the blocker valve 300 to isolate flow into the accumulators 206 during a restricted-flow position and to allow flow to and from the accumulators 206 during a flow position provides the suspension system 200 with first and second variable states which selectively allow for differing degrees of pivoting of the wings 144 relative to the center section 142. As discussed with reference to FIGS. 6A and 6B, when the blocker valve 300 is in the flow position, the first variable state is defined by the hydraulic circuit defined between the fluid cylinder 202, the accumulators 206, and the attenuation hose 208. In this first variable state, the ability of fluid to flow freely between the fluid cylinder 202 and the accumulators 206, allows the wings 144 to pivot about the center section 142 by an amount that defines a first range of motion. By allowing the wings 144 to pivot about the center section 142, the suspension system 200 enables the wings 144 to dynamically adapt to and follow terrain, which, in addition to increasing crop yield efficiency, also reduces the dynamic loads on the harvester 100 during harvesting operation.

As discussed with reference to FIGS. 7A-9B, when the blocker is in the restricted-flow position, the second variable state is defined by the hydraulic circuit defined between the fluid cylinder 202 and the attenuation hose 208. In the second variable state, the expandable nature of the attenuation hose 208 allows the attenuation hose 208 to hold fluid that may flow out of the fluid cylinder 202. This ability of the attenuation hose 208 to hold an increased capacity of fluid provides the suspension system 200 with a manner by which the wings 144 are provided with a second range of motion by which the wings 144 may pivot relative to the center section 142.

Because the second range of motion is smaller than the first range of motion (such as, e.g., by between approximately 10% and approximately 30%), the ability of the wings 144 to pivot about the center section 142 is more limited when the suspension system 200 is in the second variable state than when the suspension system 200 is in the first variable state. As such, when the header 104 is elevated from the ground with the suspension system 200 in the second variable state (such as, e.g., discussed with reference to the elevated, non-harvesting transport configuration shown in FIGS. 8A and 8B) the suspension system 200 is configured to maintain the header 104 in a relatively level configuration in which the header 104 only exhibits a minimum amount of sagging, thus minimizing the risk of the outermost ends of the wings 144 inadvertently coming into contact with the ground during non-harvesting transport of the harvester 100.

Although the range of motion through which the wings 144 are able to pivot in the second variable state is limited, by providing even a limited range of motion by which the wings 144 are able to pivot about the center section 142, (such as, e.g., by a range of between approximately ±0.05° and approximately ±2.0°) the suspension system 200 is able to reduce the mass of the header 104 that is accelerated during transport of the harvester 100 (such as, e.g., during when the harvester is an the elevated, non-harvesting transport configuration), thereby reducing the stress on the structure of the combine 102 (such as, e.g., by at least approximately 5%).

As noted above, the ability of the suspension system 200 to provide the wings 144 with a limited ability flex to while the suspension system 200 is in the second variable state is provided by the ability of the attenuation hose 208 to hold fluid that flows out from the fluid cylinder 202 when the wings 144 are subject to downward forces (such as, e.g., when the header 104 is elevated entirely off of the ground in the elevated, non-harvesting transport configuration or during the downward flex configuration in which the harvester 100 travelling with an elevated header 104 encounters uneven terrain). Accordingly, as will be understood, in various embodiments, the range of motion through which the wings 144 are able to pivot while the suspension system 200 is in the second variable state may be varied by, e.g., changing the length of the attenuation hose 208, changing the selection of materials and/or structure of the attenuation hose 208 (to either make the attenuation hose 208 more or less compressible), etc. Additionally, according to some embodiments, the suspension system 200 may optionally be provided with an additional structure via which fluid may be added to and/or removed from the circuit defined by the fluid cylinder 202 and the attenuation hose 208 when the suspension system 200 is in the second variable state.

As will be understood, although the harvesting configuration of FIGS. 6A and 6B, the transition configuration of FIGS. 7A and 7B, the elevated, non-harvesting transport configuration of FIGS. 8A and 8B, and the downward flex configuration of FIGS. 9A and 9B have been described as occurring in a sequential manner, the various configurations illustrated and described with reference to FIGS. 6A-9B may occur according to any other number of sequences, in which any of the configurations may be repeated any number of different times. Additionally, the header 104 may be subject to the configurations of FIGS. 6A-9B for varied durations of time. For example, according to various embodiments, the downward flex configuration of FIGS. 9A and 9B may directly follow the transition configuration of FIGS. 7A and 7B. In some embodiments, the transition configuration of FIGS. 7A and 7B may directly follow the elevated, non-harvesting transport configuration of FIGS. 8A and 8B.

Figure 10B:
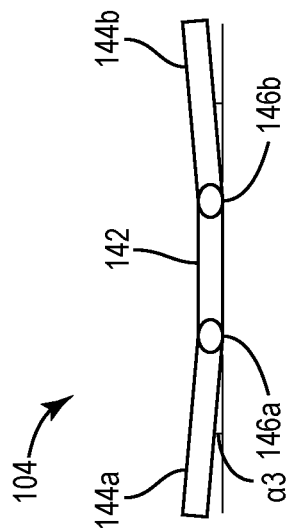
FIG. 10B is a simplified general block diagram illustrating a front view of a header during the upward flex configuration of the harvester shown in FIG. 10A, according to some embodiments.
Figure 10A:
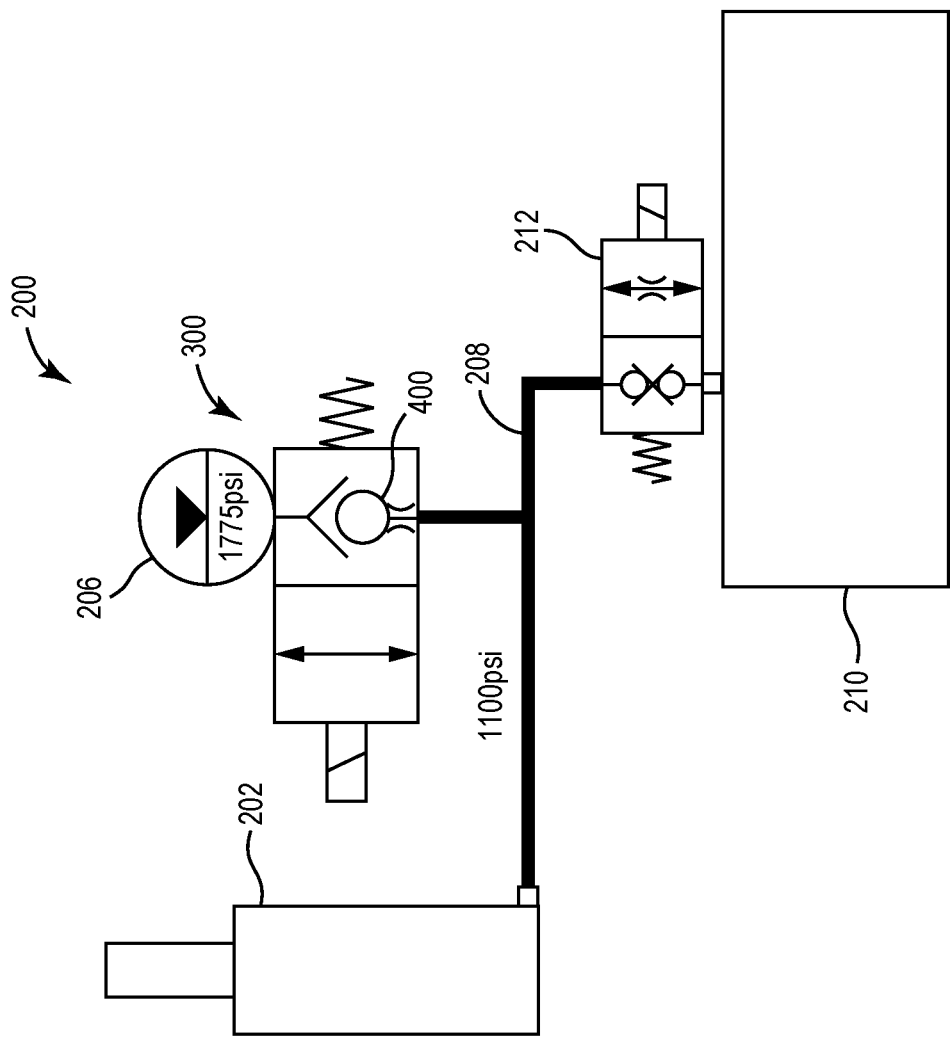
FIG. 10A is a simplified general block diagram illustrating a suspension system during an upward flex configuration of a harvester, according to some embodiments.

Referring now to FIGS. 10A-10B, a simplified block diagram of the suspension system 200 and the header 104 configuration is shown during an upward flex configuration of the harvester 100. In some embodiments, FIGS. 10A-10B represent an upward flex configuration caused by the header 104 encountering uneven terrain. For example, header 104 may experience transient negative loading (i.e., negative as in the opposite of the load caused by gravity) when riding over a divot or when returning to level ground after riding over a bump. In some embodiments, the upward flex configuration occurs subsequent a downward flex configuration, described above with reference to FIGS. 8A-9B. In other embodiments, FIGS. 10A-10B represent an upward flex configuration caused by transient negative loading due to flexure of a trailer upon which the header 104 is supported during a transport operation.

As representatively illustrated by the simplified block diagram of FIG. 10A, negatively loading the header 104 results in the displacement of some fluid from the attenuation hose 208 into the fluid cylinder 202. This displacement decreases the pressure of the fluid within the attenuation hose 208 to a pressure is that is less than the pressure of the fluid stored within the accumulators 206. Because the blocker valve 300 is in the restricted-flow position, the orificed check valve structure 400 prevents flow in the direction from the fluid cylinder 202 through the attenuation hose 208 and into the accumulators 206 while permitting some limited/metered flow of fluid from the accumulators 206 to the attenuation hose 208 and into the fluid cylinder 202. For example, the limited/metered flow rate of fluid through the orificed check valve structure 400 may be substantially less than the flow rate of fluid when the blocker valve 300 is in the flow configuration (i.e., the configuration depicted in FIG. 6A).

Meanwhile, as representatively illustrated by the simplified block diagram of FIG. 10B, the increase in the volume of fluid within the fluid cylinder 202 resulting from the displacement of fluid from the attenuation hose 208 into the fluid cylinder 202 increases the ability of the fluid cylinder 202 to lift the wing 144, which in turn causes the wing 144 to pivot upward relative to the center section 142 by an angle of $\alpha 3$ from an initial wing 144 position. However, the presence of the orificed check valve structure 400 in the blocker valve 300 constrains the angle $\alpha 3$ by which the wing 144 is permitted to pivot relative to the center section 142. By contrast, unmetered flow from the accumulators 206 to the attenuation hose 208 may result in unconstrained and permanent ratcheting of the wings 144 into an upward configuration. Permanent ratcheting of the wings 144 into the upward configuration is undesirable, as it may degrade the harvesting efficiency of the header 104 and may overload the center section 142 of the header 104, resulting in damage to the center section 142 or decoupling of the header 104 from the trailer during a transport operation.

According to various embodiments, the angle $\alpha 3$ may range from approximately 0.05° to 1.0°, and more specifically between approximately 0.1° and 0.5°. The angle $\alpha 3$ may be constrained by the restricted flow through the orificed check valve structure 400 and the compliance of the attenuation hose 208. As will be understood, the angle $\alpha 3$ by which the left wing 144a is pivoted upwards relative to the center section 142 during the upward flex configuration may be the same or may be different than the angle $\alpha 3$ by which the right wing 144b is pivoted upwards relative to the center section 142 during the upward flex configuration.

Figure 11:
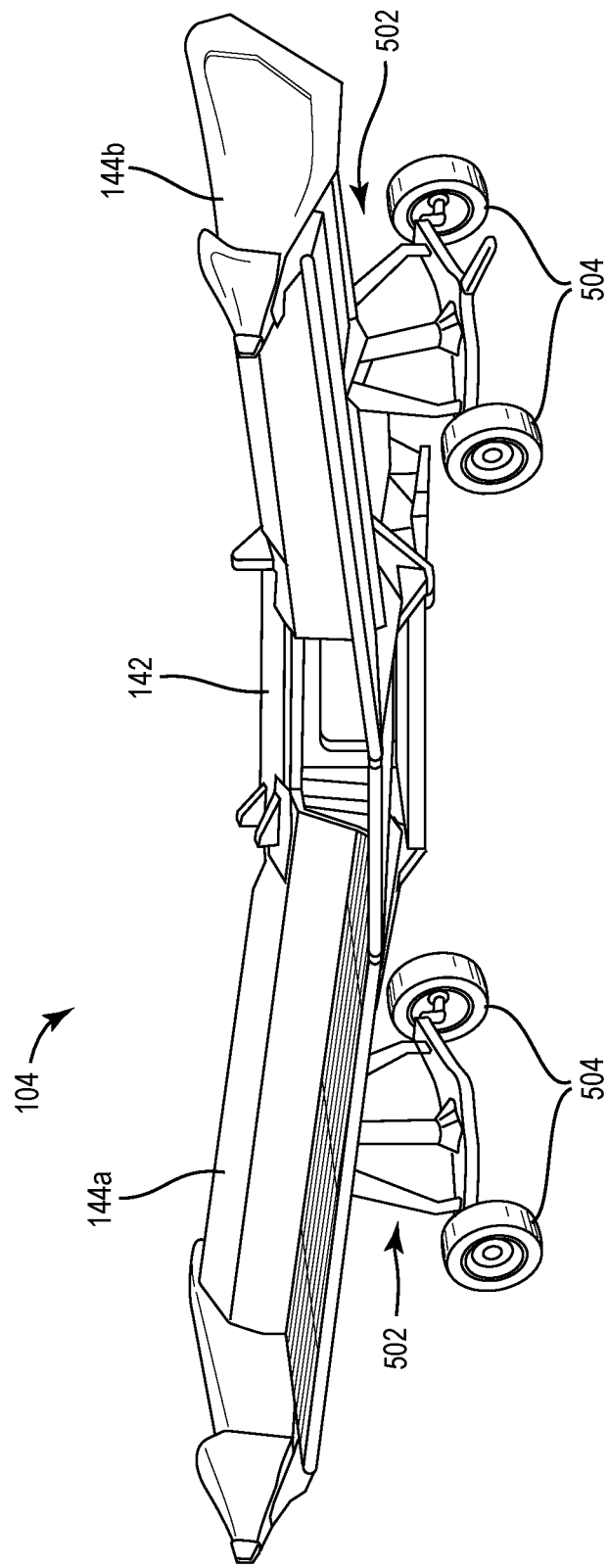
FIG. 11 illustrates a harvester in an integrated transport harvesting configuration, according to some embodiments.
Figure 12B:
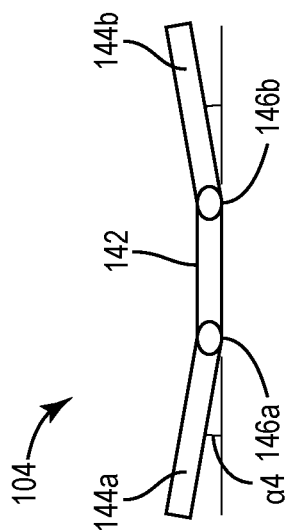
FIG. 12B is a simplified general block diagram illustrating a front view of a header during the integrated transport harvesting configuration shown in FIG. 12A, according to some embodiments.
Figure 12A:
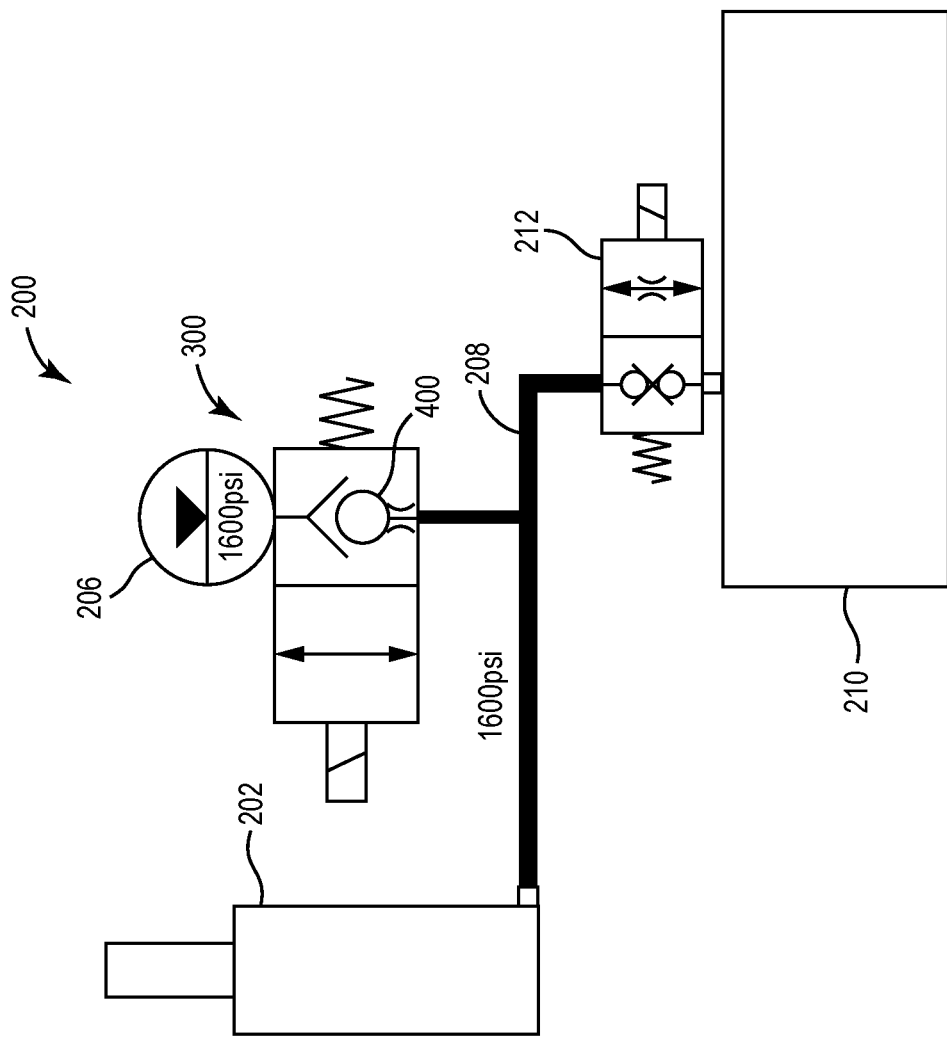
FIG. 12A is a simplified general block diagram illustrating a suspension system during an integrated transport harvesting configuration, according to some embodiments.

Referring now to FIG. 11, an agricultural harvesting header 104 in an integrated transport configuration is depicted, according to some embodiments. As shown, the integrated transport configuration of the header 104 includes integrated transport structural members 502 and a plurality of ground engaging wheels 504 that support the header 104 and apply a sustained negative load to the left wing 144a and the right wing 144b such that the left wing 144a and the right wing 144b are forced into an upward flex configuration. Turning now to FIGS. 12A-12B, a simplified block diagram of the suspension system 200 and the header 104 configuration is shown during an integrated transport configuration of the harvester 100. In some embodiments, the integrated transport configuration of the harvester 100 is identical or substantially similar to the integrated transport configuration depicted in FIG. 11.

As depicted in the simplified block diagram of FIG. 12A, the upward force on the wings due to the integrated transport structure results in the displacement of some fluid from the attenuation hose 208 into the fluid cylinder 202. This displacement decreases the pressure of the fluid within the attenuation hose 208 to a pressure that is less than the pressure of the fluid stored within the accumulators 206. Because the blocker valve 300 is in the restricted-flow position, the orificed check valve structure 400 prevents flow in the direction from the fluid cylinder 202 through the attenuation hose 208 and into the accumulators 206 while permitting some limited/metered flow of fluid from the accumulators 206 to the attenuation hose 208 and into the fluid cylinder 202 until the pressure in the accumulators 206 and the attenuation hose 208 is equalized. As described above, the limited/metered flow rate of fluid through the orificed check valve structure 400 may be substantially less than the flow rate of fluid when the blocker valve 300 is in the flow configuration (i.e., the configuration depicted in FIG. 6A).

Meanwhile, as representatively illustrated by the simplified block diagram of FIG. 12B, the increase in the volume of fluid within the fluid cylinder 202 resulting from the displacement of fluid from the attenuation hose 208 into the fluid cylinder 202 increases the ability of the fluid cylinder 202 to lift the wing 144, which in turn causes the wing 144 to pivot upward relative to the center section 142 by an angle of α4 from an initial wing 144 position. However, the presence of the orificed check valve structure 400 in the blocker valve 300 constrains the angle α4 by which the wing 144 is permitted to pivot relative to the center section 142 and prevents the fluid cylinder 202 from pulling a vacuum on the attenuation hose 208, which may result in decreased durability of the header 104.

According to various embodiments, the angle α4 may range from approximately 1.0° to 10.0°, and more specifically between approximately 3.0° and 7.0°. The angle α4 may be constrained by a physical limitation of the fluid cylinder 202. For example, in some embodiments, the fluid cylinder 202 includes a cylinder rod slidably coupled to a cylinder barrel, with the wing 144 coupled to the cylinder rod. Thus, the angle α4 is limited by an amount the cylinder rod is permitted to protrude from the cylinder barrel. As will be understood, the angle α4 by which the left wing 144a is pivoted upwards relative to the center section 142 during the upward flex configuration during integrated transport may be the same or may be different than the angle α4 by which the right wing 144b is pivoted upwards relative to the center section 142 during the integrated transport configuration.

As will be understood, although the articulated header 104 illustrated herein has been shown as comprising three sections: a center section 142, a left wing 144a, and a right wing 144b, according to other embodiments, the articulated header 104 may comprise any number of different sections, including, e.g., a two section arrangement defined by only the left wing 144a and the right wings 144b.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A wing locking system for a harvesting header comprising:
   an accumulator;
   a fluid cylinder operably attached to a wing of a harvesting header;
   a hose fluidly connecting the accumulator and the fluid cylinder; and
   a valve operably disposed between the accumulator and the fluid cylinder, the valve having a first selectable position configured to permit a first fluid flow rate between the accumulator and the fluid cylinder and a second selectable position configured to permit a second fluid flow rate from the accumulator to the fluid cylinder;
   wherein the first fluid flow rate is greater than the second fluid flow rate.

2. The wing locking system of claim 1, wherein the second selectable position of the valve permits fluid flow from the accumulator to the fluid cylinder through an orificed check valve and prevents fluid flow from the fluid cylinder to the accumulator.

3. The wing locking system of claim 1, wherein, when the valve is in the second selectable position, flow of fluid into the fluid cylinder is configured to constrain an upward pivot angle of the wing.

4. The wing locking system of claim 3, wherein the valve is in the second selectable position when the harvesting header encounters a negative loading condition.

5. The wing locking system of claim 4, wherein the upward pivot angle of the wing ranges from 0.05° to 1.0°.

6. The wing locking system of claim 3, wherein the valve is in the second selectable position when the harvesting header is in an integrated transport configuration.

7. The wing locking system of claim 6, wherein the upward pivot angle of the wing ranges from 1.0° to 10.0° and is constrained by a limitation of the fluid cylinder.

8. A method of operating a harvesting header comprising:
   providing a harvesting header comprising:
      a center section;
      a left wing hingedly attached to the center section;
      a right wing hingedly attached to the center section; and
      a wing locking system comprising:
         an accumulator;
         a fluid cylinder operably attached to at least one of the left wing and the right wing;
         a hose fluidly connecting the accumulator and the fluid cylinder; and
         a valve operably disposed between the accumulator and the fluid cylinder, the valve having a first selectable position configured to permit a first fluid flow rate between the accumulator and the fluid cylinder and a second selectable position configured to permit a second fluid flow rate from the accumulator to the fluid cylinder;
         wherein the first fluid flow rate is greater than the second fluid flow rate; and
   operating the valve in the second selectable position during at least one of a transient negative loading condition and a sustained negative loading condition caused by an integrated transport configuration of the harvesting header.

9. The method of claim 8, wherein the second selectable position permits fluid flow from the accumulator to the fluid cylinder through an orificed check valve and prevents fluid flow from the fluid cylinder to the accumulator.

10. The method of claim 8, wherein flow of fluid from the hose into the fluid cylinder causes at least one of the left wing and the right wing to pivot upwards relative to the center section by between approximately 0.05° and approximately 1.0° during the transient negative loading condition of the harvesting header.

11. The method of claim 8, wherein flow of fluid from the hose into the fluid cylinder causes at least one of the left wing and the right wing to pivot upwards relative to the center section by between approximately 1.0° and approximately 10.0° during the sustained negative loading condition caused by the integrated transport configuration of the harvesting header.

12. The method of claim 8, wherein, when the valve is in the first selectable position, the flow of fluid into the fluid cylinder and out of a fluid accumulator and out from the fluid cylinder and into the fluid accumulator is configured to allow the fluid cylinder to move the at least one of the left wing and the right wing within a first range along a wing trajectory and when the valve is in the second selectable position, the flow of fluid out from the fluid accumulator into the fluid cylinder is configured to allow the fluid cylinder to move the at least one of the left wing and the right wing within a second range along the wing trajectory, the second range being smaller than the first range.

13. The method of claim 8, wherein the transient negative loading condition is caused by uneven terrain.

14. The method of claim 8, wherein the transient negative loading condition is caused by flexure of a trailer transporting the harvesting header.

15. The method of claim 8, wherein, when the harvesting header is in the integrated transport configuration, the harvesting header is supported by a plurality of structural members and a plurality of ground engaging wheels.

16. A harvester system comprising:
a center section;
a left wing hingedly attached to the center section;
a right wing hingedly attached to the center section; and
a wing locking system comprising:
    an accumulator;
    a fluid cylinder operably attached to at least one of the left wing and the right wing;
    a hose fluidly connecting the accumulator and the fluid cylinder; and
    a valve operably disposed between the accumulator and the fluid cylinder, the valve having a first selectable position configured to permit a first fluid flow rate between the accumulator and the fluid cylinder and a second selectable position configured to permit a second fluid flow rate from the accumulator to the fluid cylinder;
wherein the first fluid flow rate is greater than the second fluid flow rate.

17. The harvester system of claim 16, wherein the second selectable position of the valve permits fluid flow from the accumulator to the fluid cylinder through an orificed check valve and prevents fluid flow from the fluid cylinder to the accumulator.

18. The harvester system of claim 16, wherein flow of fluid from the hose into the fluid cylinder causes at least one of the left wing and the right wing to pivot upwards relative to the center section by between approximately 0.05° and approximately 1.0° during a transient negative loading condition.

19. The harvester system of claim 16, wherein flow of fluid from the hose into the fluid cylinder causes at least one of the left wing and the right wing to pivot upwards relative to the center section by between approximately 1.0° and approximately 10.0° during a sustained negative loading condition caused by an integrated transport configuration of a harvesting header.

20. The harvester system of claim 19, wherein the harvester system further comprises a plurality of structural members and a plurality of ground engaging wheels.

* * * * *